United States Patent
Maheshwari et al.

(10) Patent No.: US 8,539,598 B2
(45) Date of Patent: Sep. 17, 2013

(54) DETECTION OF CUSTOMIZATIONS OF APPLICATION ELEMENTS

(75) Inventors: Rahul Maheshwari, Faridabad (IN); Abhijeet Gadgil, Pune (IN); Vikram Shinde, Pune (IN)

(73) Assignee: BMC Software, Inc., Houston, TX (US)

( * ) Notice: Subject to any disclaimer, the term of this patent is extended or adjusted under 35 U.S.C. 154(b) by 271 days.

(21) Appl. No.: 12/978,002

(22) Filed: Dec. 23, 2010

(65) Prior Publication Data

US 2012/0166811 A1 Jun. 28, 2012

(51) Int. Cl.
  *G06F 7/04* (2006.01)
(52) U.S. Cl.
  USPC .......................................... 726/26; 713/187
(58) Field of Classification Search
  USPC .......................................... 726/26; 713/187
  See application file for complete search history.

(56) References Cited

U.S. PATENT DOCUMENTS

| | | | |
|---|---|---|---|
| 8,015,415 B1 * | 9/2011 | Woolsey et al. | 713/189 |
| 2008/0079979 A1 * | 4/2008 | Holt et al. | 358/1.14 |
| 2010/0088517 A1 * | 4/2010 | Piersol | 713/171 |

* cited by examiner

*Primary Examiner* — Christopher Brown

(57) ABSTRACT

Systems, methods and computer readable media for detecting customization of an application running on a customer's environment are described. An application's original source can maintain a master hash registry for an application. The master hash registry includes valid and invalid hash codes for all objects in the application across all versions of the application. This master hash registry may be provided to the customer. A customization detection system loads a master hash registry to memory. The customization detection system may then retrieve an application object from the application, generate hash values for the object and compare these values with the object's master hash registry values to determine whether the application object is new or whether it has been customized in a supportable or unsupportable manner. The customization detection system may then set the object's customization status based on the results of the comparison.

14 Claims, 5 Drawing Sheets

```xml
<environmentInfo>
    <application name="BMC Remedy Sample Application 1">
        <version>1.0</version>
        <version>2.0</version>
        <version>3.0</version>
    </application>
</environmentInfo>
<objects type="Form">
    <object key="Object1">
        <validHashList>
            <hash>valid hash 11</hash>
            <hash>valid hash 12</hash>
        </validHashList>
        <invalidHashList>
            <hash>invalid hash 11</hash>
        </invalidHashList>
    </object>
    <object key="Object2">
        <validHashList>
            <hash>valid hash 21</hash>
        </validHashList>
        <invalidHashList>
            <hash>invalid hash 21</hash>
        </invalidHashList>
    </object>
    <object key="Object3">
        <validHashList>
            <hash>valid hash 31</hash>
            <hash>valid hash 32</hash>
            <hash>valid hash 33</hash>
        </validHashList>
        <invalidHashList>
            <hash>invalid hash 31</hash>
            <hash>invalid hash 33</hash>
        </invalidHashList>
    </object>
</objects>
```

FIG. 3

This disclosure relates generally to the field of computer systems. More particularly, but not by way of limitation, this disclosure relates to a technique for effectively detecting customizations done to a software application after the application is deployed to a customer's environment.

DETECTION OF CUSTOMIZATIONS OF APPLICATION ELEMENTS

BACKGROUND

This disclosure relates generally to the field of computer systems. More particularly, but not by way of limitation, this disclosure relates to a technique for effectively detecting customizations done to a software application after the application is deployed to a customer's environment.

In an application environment, a customer deployed application has an initial definition. Over time, additional versions of the application are generally supplied to the customer by the application's original source. These later versions may add or alter objects within the application. The application may also have objects that are added or altered by the customer or a third party. As used herein, the term application "objects" generally means elements within the application.

Sometimes it is necessary to know whether objects in an application have been changed, and whether the change is compatible with the customization rules set out by the application's original source. There are some existing applications which use checksums to detect file alterations. For example, CheckMate is a preference pane for Mac OS® X 10.1 and higher that allows a user to generate and compare secure MD5 checksums for critical files. (MACOS is a registered trademark of Apple Computer Inc.) This can be used to detect whether files have been altered by viruses, rootkits, Trojan horses, or other possibly malicious programs. However, use of checksums on files does not allow detection of specific types of changes in a file and, further, does not allow detection of changes in different versions of the same file.

There is a need, therefore, for a simple, elegant mechanism to identify which application component objects have been changed by a customer and further, which have been changed in a supportable way versus those changed in an unsupportable way.

SUMMARY

Various embodiments disclose systems, methods and computer readable media for detecting customization to an application in a customer's environment. In one embodiment, a method is disclosed that retrieves a master hash registry from an application's original source (e.g., a developer). Next, an application object is obtained, whereafter valid and invalid hash codes may be generated for the object. The generated hash codes may then be compared with the master hash registry to determine the object's customization status.

In another embodiment, a customization detection system is disclosed that includes a processor, a storage subsystem coupled to the processor, and a software program, application or module stored in the storage subsystem, comprising instructions that when executed by the processor cause the processor to perform one of the methods described above.

In still another embodiment, a non-transitory computer readable medium is disclosed wherein the non-transitory computer readable medium (i.e., a program storage device) has instructions for causing a programmable control device to perform one of the methods described above.

In yet another embodiment, a networked computer system is disclosed that includes a plurality of computers communicatively coupled, at least one of the plurality of computers programmed to perform at least a portion of a method described above wherein the entire method is performed collectively by the plurality of computers.

BRIEF DESCRIPTION OF THE DRAWINGS

FIG. 3 illustrates an example master hash registry for an application according to one embodiment.

DETAILED DESCRIPTION

Various embodiments disclose systems, methods and computer readable media that provide customization detection of an application in a customer's environment. An application's original source (e.g., a developer) can maintain a master hash registry for an application. The master hash registry includes valid and invalid hash codes for all objects in the application across all versions of the application. The application's original source can provide this master hash registry to the customer. According to one embodiment, a customization detection system loads a master hash registry to memory. The customization detection system may then retrieve an application object from the application, generate hash values for the object and compare these values with the object's master hash registry values to determine whether the application object is new or whether it has been customized in a supportable or unsupportable manner. The customization detection system may then set the object's customization status based on the results of the comparison.

In the following description, for purposes of explanation, numerous specific details are set forth in order to provide a thorough understanding of the invention. It will be apparent to one skilled in the art, however, that the invention may be practiced without these specific details. In other instances, structure and devices are shown in block diagram form in order to avoid obscuring the invention. It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the art having the benefit of this disclosure. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 1:
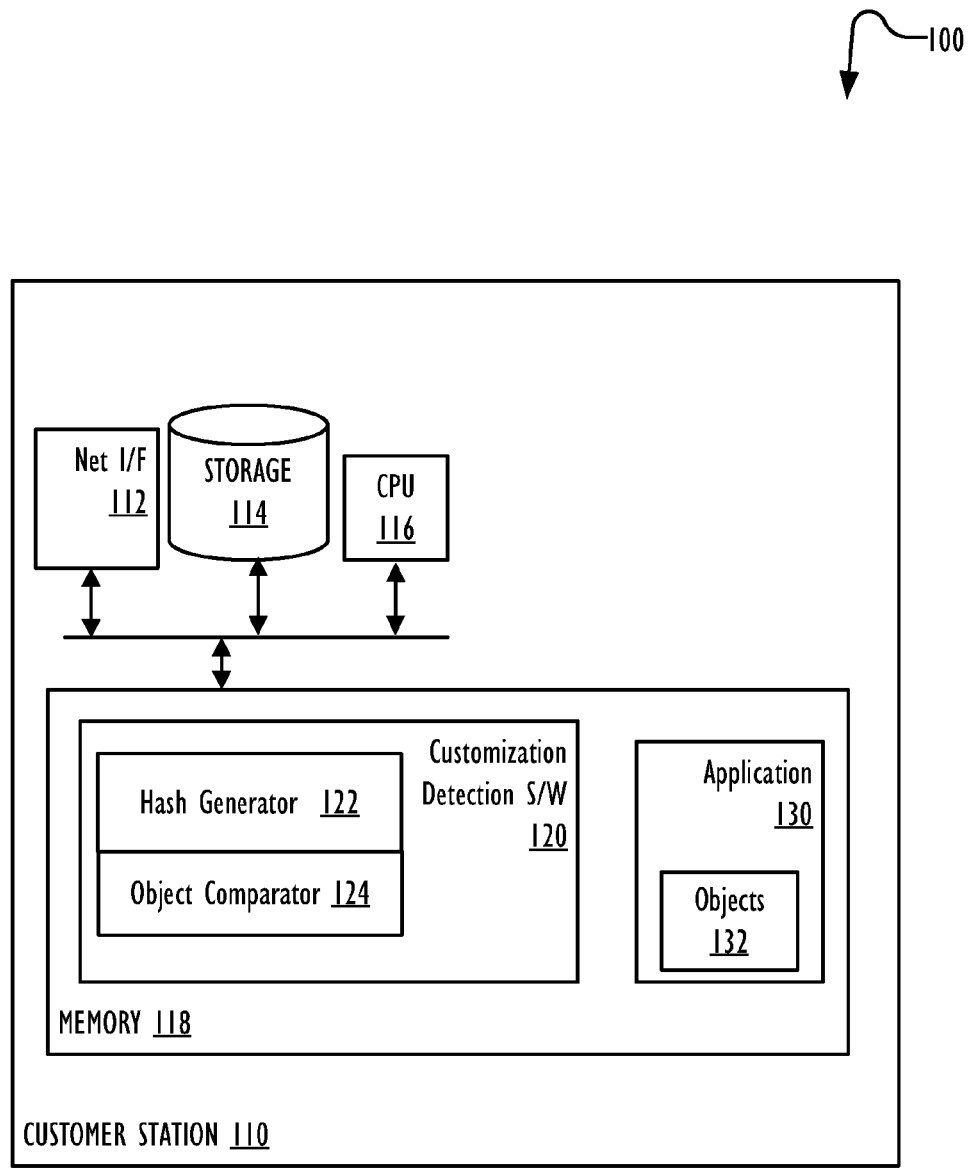
FIG. 1 illustrates an example customization detection system.

FIG. 1 illustrates example customization detection system 100 that incorporates elements that enables a customer station to detect and report the customization status for objects within an application. System 100 includes customer station 110 coupled to a network (not shown) via network interface 112.

Example customer station 110 includes customization detection software 120, which may be loaded into memory 118 and, when executed by CPU 116, provides at least some of the customization detection functionality described herein. Customer station 110 also includes persistent storage device 114 (e.g., a hard disk drive) used to store configuration settings of customization detection software 120. As shown in FIG. 1, customization detection software 120 includes hash generator 122 and object comparator 124. Hash generator 122 may be used to generate hash codes for objects 132 of application 130. Object comparator 124 compares properties of an object with a master hash registry of the application (not shown), which will be discussed in detail below. Customization detection software 120 comprises a collection of functional blocks. Each functional block may be implemented as a separate software component using, for example, any number of conventional programming languages including C, C++, Java®, and so on. (JAVA is a registered trademark of Sun Microsystems, Inc.) Furthermore, it will be appreciated by those skilled in the art that not every embodiment need require every functional block shown in FIG. 1, or may include additional functional blocks which have been left out of FIG. 1 to avoid obscuring the disclosed embodiment with unnecessary detail. Software code modules implementing the functional blocks and representing customization detection system 100 may reside and execute on a single machine, or may be distributed in some meaningful manner to reside and execute on multiple machines.

As disclosed herein, embodiments can take an existing application running on a customer machine and detect and report the customization status of the objects within that application. In one embodiment, an application object may have one of the following customization statuses: "As Shipped", "New" or "Modified." An "As Shipped" status means that the object is in the original definition or some other version of definition that was supplied by the application's original source. An object having a "New" status means that the object is new to the application; it was not included in the application supplied by the application's original source. The object may have been added by the customer or a third party. An object having a "Modified" status means that the object was part of the application as supplied by the original source; however the current definition of the object in the application has been modified from the definition originally supplied. For any object definition that has been modified, the customization status of the object can also identify whether the object has been modified in a way that is compatible or incompatible with modification rules set out by the application's original source.

Figure 2:
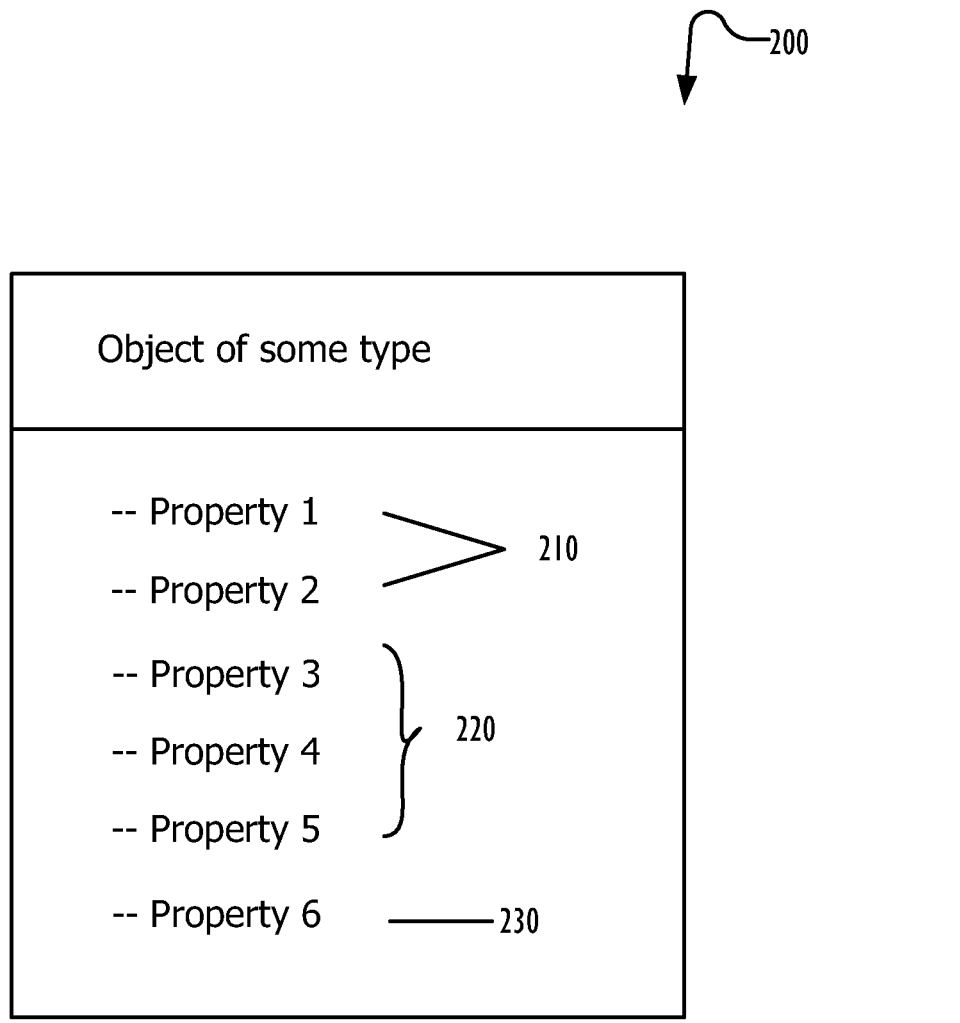
FIG. 2 illustrates an example object with properties divided into three groups.

FIG. 2 shows example application object 200. In one embodiment, the properties of an object are divided into three groups: "valid hash" properties 210, "invalid hash" properties 220 and "can be ignored" properties 230. Valid hash properties 210 comprise a group of properties that, if changed, the change may be considered as valid/compatible. For example, a person object may have a "salary" property. The original source of the person object may allow customers to modify the salary property; the salary property would be a valid hash property for the person object. Valid hash properties may be used to generate a "valid hash code" for the object (see discussion below). Invalid hash properties 220 comprise a group of properties that, if changed, the change may be considered as invalid/incompatible by the application's original source. For example, a person object may have the properties "name," "birth date" and "identification number." The application's original source may not allow any customizations to these properties. These properties would be invalid hash properties for the person object. Invalid hash properties may be used to generate an "invalid hash code" for an object (see discussion below). "Can be ignored" properties 230 comprise those properties that are neither valid hash properties nor invalid hash properties. For example, the property "hair color" of a person object may be a "can be ignored" property. "Can be ignored" properties, if changed, do not make any impact in preserving customizations and may be ignored during hash generation. It will be recognized that there are some aspects of a definition that may differ but if that difference is not significant to the definition, these differences may not be considered as a part of the comparison for whether the object is different than a supplied definition.

For each object in an application, two hash codes may be generated: a valid hash code and an invalid hash code. The valid hash code may be used to determine whether a customer has modified an object in a compatible way. The invalid hash code reflects whether a customer has modified an object in a non-compatible fashion. In one embodiment, a valid hash code may be calculated by taking into account all of the valid hash properties of an object. Values of all of the valid hash properties can be concatenated to form a full string (valid values). For example, in object 200, the values of property 1 and property 2 may be concatenated. A valid hash code can then be generated from this concatenated string. Similarly, values of all of the invalid hash properties of an object may be concatenated to form a full string; an invalid hash code can then be generated using this full string.

An application's original source can maintain a master registry (hash registry) of all out-of-box objects along with their valid and invalid hash codes for each release of the application. FIG. 3 illustrates example master hash registry 300 for an application having three objects. In the $1^{st}$ release of the application, there were three objects: Object1, Object2, and Object3. In a $2^{nd}$ release, the application's original source modified/updated the definition of Object1 and Object3. In a $3^{rd}$ release of same application, the definition of Object3 was changed again. As shown in FIG. 3, master hash registry 300 has three valid hash entries 310 for Object3, which represent the three versions of Object3. Object3 also has two invalid hash entries 320 which correspond to two possible incompatible customizations of Object3. Master hash registry 300 in FIG. 3 includes only one application for illustrative purposes, a master hash registry may comprise entries for multiple applications.

An application's original source may also provide master hash registries to its customers. A customer may obtain the master hash registry by, for example, downloading it from the supplier's web site. Customization detection system 100 can load all, or a portion, of the master hash registry into memory 118, and compare objects in the application against the master hash registry. If an object does not exist in the master hash registry, the customization status of that object may be set to "New" to identify it as a newly added object. If the object is present in the master hash registry, customization detection system 100 can calculate valid and invalid hash codes for that object using hash generator 122. Customization detection system 100 can then compare the calculated valid and invalid hash codes against the master hash registry to determine the object's customization status via object comparator 124. If the calculated invalid hash code is not present in the master hash registry, the object may be determined to be modified in a manner not compatible with the supplier's customization rules. If calculated invalid hash code is present in the master hash registry but the calculated valid hash code is not, the object may be determined to have been modified by the customer as permitted by the application supplier's recommendation/guidelines. If both calculated valid and invalid hash codes are present in the master hash registry, the object may be determined to not having been modified; therefore its customization status may be set to "As Shipped".

Figure 4:
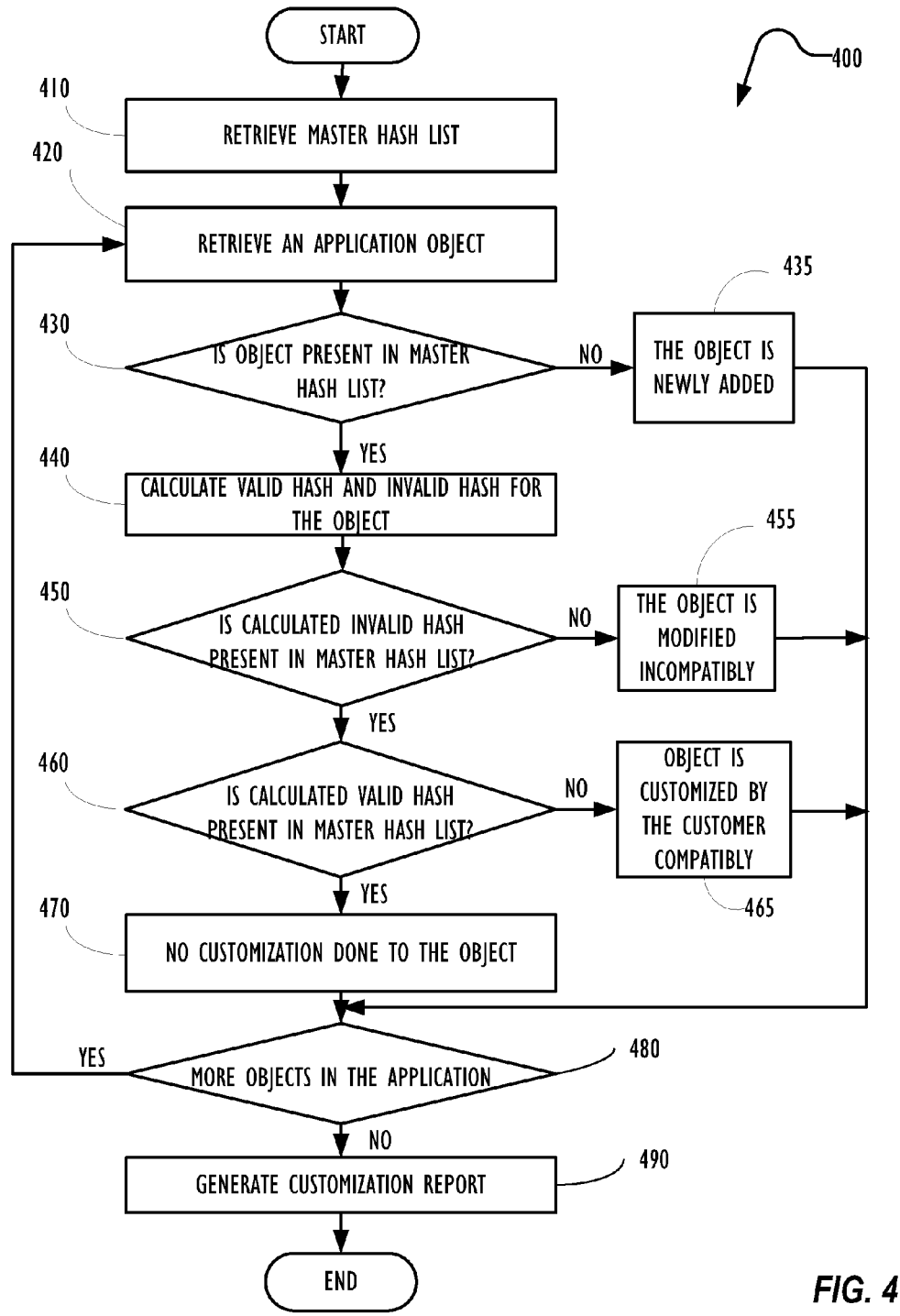
FIG. 4 illustrates, in flowchart form, a method for detecting customizations of an application deployed in a customer's environment according to one embodiment.

FIG. 4 illustrates one embodiment of software customization detection operation 400 for detecting customizations in a software application deployed in a customer environment. At block 410, the customization detection system retrieves a master hash registry for the application obtained from the application's original source, and loads it into memory 118. Customization detection system 100 may then retrieve an application object from the application running on a customer's machine at block 420. Customization detection system 100 may then determine whether the application object exists in the master hash registry via object comparator 124, as shown in block 430. If the object is not present in the master hash registry, the "No" prong of block 430, the customization detection system may declare that the application object is newly added, and can thereafter sets the object's customization status to "New" at block 435. Operation then continues at block 480 where a check is made to whether there are more objects in the application to be analyzed. On the other hand, if the object is present in the master hash registry, the "Yes" prong of block 430, the customization detection system calculates valid and invalid hashes for the object via hash generator 122 at block 440. Hash generator 122 may use the same technique to calculate hash values for an object as was used by the application's original source.

At blocks 450 and 460, the customization detection system compares the calculated valid and invalid hashes of the object against the master hash registry via object comparator 124. At block 450, object comparator 124 determines whether the calculated invalid hash is present in the master hash registry. If the answer is no, the "No" prong of block 450, the customization status of the object may be set to incompatibly modified, block 455. If calculated invalid hash exists in the master hash registry, object comparator 124 determines whether the calculated valid hash is present in the master hash registry, block 460. If the answer is no, the "No" prong of block 460, the customization status of the object may be set to compatibly modified, block 465. If both the calculated invalid and valid hash values are present in the master hash registry, as in block 470, it may be determined that no customization has been done to the object—the customization status of the object may be set to "As Shipped."

After the customization status of the object is set, as shown in blocks 435, 455, 465 and 470, customization detection system 100 may then check whether there are more objects in the application that need to be processed, block 480. If there are more objects left, customization detection system 100 retrieves the next object, and repeats steps 430-470 as described above. If no more objects need to be checked, customization detection system 100 can generate a customization report for the application at block 490.

Figure 5:
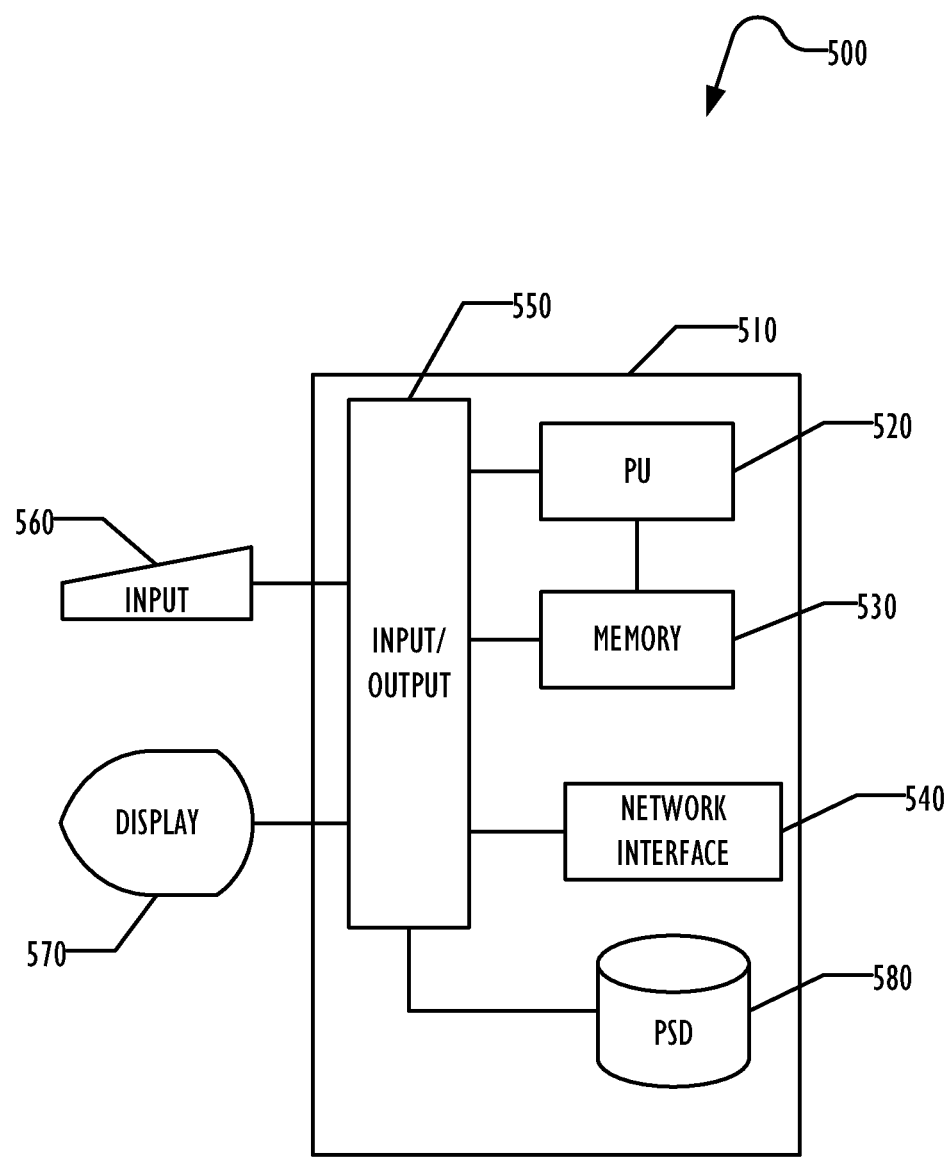
FIG. 5 illustrates, in block diagram form, an example computer system which might be utilized to implement various embodiments disclosed herein.

FIG. 5 shows example computer system 500. Example computer system 500 may be used as customer station 110. Example computer 500 comprises system unit 510 which may be optionally connected to input device 560 (e.g., keyboard, mouse, touch screen, etc.) and display 570. Program storage device (PSD) 580 is included within system unit 510. Also included within system unit 510 is network interface 540 for communication with other devices via a network (not shown). Network interface 540 may be included within system unit 510 or be external to system unit 510. In either case, system unit 510 may be communicatively coupled to network interface 540. Program storage device 580 represents any form of non-volatile storage including, but not limited to, all forms of optical and magnetic storage, including solid-state, storage elements and removable media. Program storage device 580 may be used for storage of software to control system unit 510 in, data for use by the computer 500, or both.

System unit 510 may be programmed to perform methods in accordance with this disclosure (an example of which is shown in FIG. 4). System unit 510 comprises processor unit (PU) 520, input-output (I/O) interface 550 and memory 530. Processing unit 520 may include any programmable controller device including, for example, one or more members of the Intel Atom®, Core®, Pentium® and Celeron® processor families from Intel and the Cortex and ARM processor families from ARM. (INTEL, INTEL ATOM, CORE, PENTIUM, and CELERON are registered trademarks of the Intel Corporation. CORTEX is a registered trademark of the ARM Limited Corporation. ARM is a registered trademark of the ARM Limited Company.) Memory 530 may include one or more memory modules and comprise random access memory (RAM), read only memory (ROM), programmable read only memory (PROM), programmable read-write memory, and solid-state memory. One of ordinary skill in the art will also recognize that PU 520 may also include some internal memory including, for example, cache memory.

In addition, acts in accordance with the method of FIG. 4 may be performed by example computer system 500 including a single computer processor, a special purpose processor (e.g., a digital signal processor, "DSP"), a plurality of processors coupled by a communications link or a custom designed state machine, or other device capable of executing instructions organized into one or more program modules. Custom designed state machines may be embodied in a hardware device such as an integrated circuit including, but not limited to, application specific integrated circuits ("ASICs") or field programmable gate array ("FPGAs").

Various changes in the components as well as in the details of the illustrated operational method are possible without departing from the scope of the following claims. For example, the illustrative system of FIG. 1 may be comprised of more than one computer communicatively coupled via a communication network, wherein the computers may be mainframe computers, minicomputers, workstations or any combination of these. Further, monitored applications may execute on multiple hardware platforms. Such a network may be composed of one or more local area networks, one or more wide area networks, or a combination of local and wide-area networks. In addition, the networks may employ any desired communication protocol and further may be "wired" or "wireless." Acts in accordance with FIG. 4 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method for detecting customizations of an application having at least one object executing on a computer, the method comprising:
   loading, by at least one processor, at least a portion of a master hash registry of an application into a memory;
   loading, by the at least one processor, at least one object from the application into the memory, the at least one object including at least one valid hash property and at least one invalid hash property, the at least one valid hash property being one or more properties that, if changed, are compatible with the application, the at least one invalid hash property being one or more properties that, if changed, are incompatible with the application;
   comparing, by the at least one processor, the at least one object against the master hash registry including determining whether the at least one object exists in the master hash registry;
   calculating, by the at least one processor, an invalid hash code for the at least one object based on the at least one invalid hash property, and a valid hash code for the at least one object based on the at least one valid hash property, if the at least one object is determined as existing in the master hash registry;
   determining, by the at least one processor, whether the invalid hash code and the valid hash code exist in the master hash registry, if the at least one object is determined as existing in the master hash registry; and
   determining, by the at least one processor, a customization status for the at least one object including setting the customization status to indicate that the at least one object has not been modified if both the invalid hash code and the valid hash code are present in the master hash registry.

2. The method of claim 1 wherein the determining a customization status for the at least one object further comprises setting the customization status to New if the at least one object is determined not to exist in the master hash registry.

3. The method of claim 1 wherein the determining a customization status for the at least one object further comprises setting the customization status to Incompatibly Modified if the invalid hash code is determined not to be present in the master hash registry.

4. The method of claim 1 wherein the calculating an invalid hash code for the at least one object comprises:
   concatenating values of at least two invalid hash properties of the at least one object to form an invalid hash value string; and
   generating the invalid hash code from the invalid hash value string.

5. The method of claim 1 wherein the determining a customization status for the at least one object comprises setting the customization status to Compatibly Modified if the invalid hash code is present in the master hash registry and the valid hash code is not present in the master hash registry.

6. The method of claim 1 wherein the calculating a valid hash code for the at least one object comprises:
   concatenating values of at least two valid hash properties of the at least one object to form a valid hash value string; and
   generating the valid hash code from the valid hash value string.

7. The method of claim 1 wherein the loading at least a portion of a master hash registry of an application into a memory includes loading the master hash registry from an original source of the application, wherein the master hash registry includes one or more valid hash codes and one or more invalid hash codes for the at least one object.

8. The method of claim 1 wherein the valid hash code for the at least one object is generated by concatenating valid hash properties of the at least one object to form a string and generating the valid hash code from the string.

9. The method of claim 1 wherein the invalid hash code for the at least one object is generated by concatenating invalid hash properties of the at least one object to form a string and generating the invalid hash code from the string.

10. The method of claim 1 further comprising generating a customization status report for the application.

11. A non-transitory computer-readable medium storing instructions that when executed cause at least one processor to detect customizations of an application having at least one object executing on a computer, the instructions including instructions to:
    load at least a portion of a master hash registry of an application into a memory;
    load at least one object from the application into the memory, the at least one object including at least one valid hash property and at least one invalid hash property, the at least one valid hash property being one or more properties that, if changed, are compatible with the application, the at least one invalid hash property being one or more properties that, if changed, are incompatible with the application;
    compare the at least one object against the master hash registry including determining whether the at least one object exists in the master hash registry;
    calculate an invalid hash code for the at least one object based on the at least one invalid hash property, and a valid hash code for the at least one object based on the at least one valid hash property, if the at least one object is determined as existing in the master hash registry;
    determine whether the invalid hash code and the valid hash code exist in the master hash registry, if the at least one object is determined as existing in the master hash registry; and
    determine a customization status for the at least one object including setting the customization status to indicate that the at least one object has not been modified if both the invalid hash code and the valid hash code are present in the master hash registry.

12. The non-transitory computer-readable medium of claim 11, wherein the determine a customization status for the at least one object includes setting the customization status to Compatibly Modified if the invalid hash code is present in the master hash registry and the valid hash code is not present in the master hash registry.

13. The non-transitory computer-readable medium of claim 11, wherein the determine a customization status for the at least one object includes setting the customization status to Incompatibly Modified if the invalid hash code is determined not to be present in the master hash registry.

14. A system for detecting customization of an application having at least one object executing on a computer, the system comprising:

> at least one processor;
>
> a non-transitory computer-readable medium including instructions, when executed by the at least one processor, are configured to implement a customization detection unit,
>
> the customization detection unit configured to load at least a portion of a master hash registry of an application into a memory,
>
> the customization detection unit configured to load at least one object from the application into the memory, the at least one object including at least one valid hash property and at least one invalid hash property, the at least one valid hash property being one or more properties that, if changed, are compatible with the application, the at least one invalid hash property being one or more properties that, if changed, are incompatible with the application,
>
> the customization detection unit configured to compare the at least one object against the master hash registry including determining whether the at least one object exists in the master hash registry,
>
> the customization detection unit configured to calculate an invalid hash code for the at least one object based on the at least one invalid hash property, and a valid hash code for the at least one object based on the at least one valid hash property, if the at least one object is determined as existing in the master hash registry;
>
> the customization detection unit configured to determine whether the invalid hash code and the valid hash code exist in the master hash registry, if the at least one object is determined as existing in the master hash registry,
>
> the customization detection unit configured to determine a customization status for the at least one object including setting the customization status to indicate that the at least one object has not been modified if both the invalid hash code and the valid hash code are present in the master hash registry.

* * * * *